US009587139B2

(12) United States Patent
Kugel et al.

(10) Patent No.: US 9,587,139 B2
(45) Date of Patent: Mar. 7, 2017

(54) CURABLE POLYUREA FORMING COMPOSITION, METHOD OF MAKING, AND COMPOSITE ARTICLE

(71) Applicant: 3M INNOVATIVE PROPERTIES COMPANY, St. Paul, MN (US)

(72) Inventors: Alexander J. Kugel, Woodbury, MN (US); Clinton L. Jones, Somerset, WI (US); Cori S. Apel, Woodbury, MN (US); Ryan B. Prince, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 150 days.

(21) Appl. No.: 14/399,254

(22) PCT Filed: Jun. 4, 2013

(86) PCT No.: PCT/US2013/044111
§ 371 (c)(1),
(2) Date: Nov. 6, 2014

(87) PCT Pub. No.: WO2013/188176
PCT Pub. Date: Dec. 19, 2013

(65) Prior Publication Data
US 2015/0104652 A1 Apr. 16, 2015

Related U.S. Application Data

(60) Provisional application No. 61/660,245, filed on Jun. 15, 2012.

(51) Int. Cl.
*B32B 27/00* (2006.01)
*C09D 175/02* (2006.01)
(Continued)

(52) U.S. Cl.
CPC ......... *C09D 175/02* (2013.01); *C08G 18/282* (2013.01); *C08G 18/3234* (2013.01);
(Continued)

(58) Field of Classification Search
CPC .............. C08G 18/282; C08G 18/3234; C08G 18/3821; C08G 2150/90; C08G 2150/50;
(Continued)

(56) References Cited

U.S. PATENT DOCUMENTS 3,386,942 A 6/1968 Bell
3,595,731 A 7/1971 Davies
(Continued)

FOREIGN PATENT DOCUMENTS

CA 1252003 4/1989
CA 2057124 2/1993
(Continued)

OTHER PUBLICATIONS

US 7,581,483, 09/2009, Hall (withdrawn)
(Continued)

*Primary Examiner* — Eisa Elhilo
(74) *Attorney, Agent, or Firm* — Bradford B. Wright

(57) ABSTRACT

A curable composition includes: a) at least one aliphatic polyisocyanate; b) at least one aliphatic polyamine; and c) from 8 to 17 percent by weight of at least one liquid compound, based on the total weight of components a), b) and c) combined. Each liquid compound is independently represented by the formula (I): wherein Z represents an n valent organic group, and n represents an integer ≥1. Methods of coating the curable coating on a substrate and composite articles are also disclosed.

(Continued)

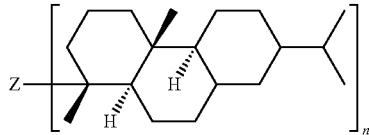

(I)

19 Claims, 1 Drawing Sheet

(51) Int. Cl.
   C08G 18/28 (2006.01)
   C08G 18/32 (2006.01)
   C08G 18/38 (2006.01)
(52) U.S. Cl.
   CPC ..... *C08G 18/3821* (2013.01); *C08G 2150/50* (2013.01); *C08G 2150/90* (2013.01); *Y10T 428/31551* (2015.04)
(58) Field of Classification Search
   CPC .. C09D 175/02; C08K 5/02; Y10T 428/31551
   See application file for complete search history.

(56) References Cited

U.S. PATENT DOCUMENTS

| | | |
|---|---|---|
| 3,856,749 A | 12/1974 | Hoeschele |
| 3,900,687 A | 8/1975 | Meader, Jr. |
| 3,900,688 A | 8/1975 | Thoma |
| 3,931,449 A | 1/1976 | Hirata |
| 4,002,598 A | 1/1977 | Waddill |
| 4,036,906 A | 7/1977 | Finelli |
| 4,178,427 A | 12/1979 | Waddill |
| 4,328,330 A | 5/1982 | Wellner |
| 4,409,266 A | 10/1983 | Wieczorrek |
| 4,847,321 A | 7/1989 | Hess |
| 4,881,951 A | 11/1989 | Wood |
| 5,352,733 A | 10/1994 | Hart |
| 5,814,398 A | 9/1998 | Kronz |
| 5,919,570 A | 7/1999 | Hostettler |
| 6,290,614 B1 | 9/2001 | Kennedy, III |
| 6,297,320 B1 | 10/2001 | Tang |
| 6,369,189 B1 | 4/2002 | Naderhoff |
| 6,451,963 B1 | 9/2002 | Langel |
| 6,586,523 B1 | 7/2003 | Blum |
| 6,632,147 B2 | 10/2003 | Cavallaro |
| 6,730,150 B1 | 5/2004 | Titterington |
| 6,730,353 B2 | 5/2004 | Robinson |
| 6,774,206 B2 | 8/2004 | Danielmeier |
| 6,774,207 B2 | 8/2004 | Danielmeier |
| 6,790,925 B2 | 9/2004 | Danielmeier |
| 6,797,789 B2 | 9/2004 | Davis |
| 6,797,798 B2 | 9/2004 | Johnston |
| 6,903,156 B2 | 6/2005 | Muller |
| 6,905,424 B2 | 6/2005 | Kennedy, III |
| 7,001,948 B2 | 2/2006 | Gupta |
| 7,091,280 B2 | 8/2006 | Rische |
| 7,189,429 B2 | 3/2007 | Robinson |
| 7,781,513 B2 | 8/2010 | Lucas |
| 7,833,575 B2 | 11/2010 | Gupta |
| 7,927,704 B2 | 4/2011 | Mager |
| 7,980,165 B2 | 7/2011 | Misencik |
| 8,513,334 B2 | 8/2013 | Grablowitz |
| 2003/0013835 A1 | 1/2003 | Zahariadis |
| 2004/0197472 A1 | 10/2004 | Scofield |
| 2005/0244628 A1 | 11/2005 | Turek |
| 2006/0112996 A1 | 6/2006 | Poole |
| 2006/0205859 A1 | 9/2006 | Bachon |
| 2007/0043197 A1 | 2/2007 | Posey |
| 2007/0049684 A1 | 3/2007 | Rische |
| 2007/0066786 A1 | 3/2007 | Hanson, Jr. |
| 2007/0078234 A1 | 4/2007 | Mager |
| 2007/0167565 A1 | 7/2007 | Rische |
| 2008/0097068 A1 | 4/2008 | Thiede |
| 2008/0200620 A1 | 8/2008 | Broekaert |
| 2008/0237356 A1 | 10/2008 | Singleton |
| 2009/0030161 A1 | 1/2009 | Johnston |
| 2009/0171040 A1 | 7/2009 | Griswold |
| 2009/0293350 A1 | 12/2009 | Kania |
| 2009/0309077 A1 | 12/2009 | Gupta |
| 2009/0326121 A1* | 12/2009 | Stockl ............. C08L 93/04 524/287 |
| 2010/0021676 A1 | 1/2010 | Laubry |
| 2010/0076143 A1 | 3/2010 | Yakulis |
| 2010/0080920 A1 | 4/2010 | Lagrange |
| 2010/0252217 A1 | 10/2010 | Eberhardt |
| 2010/0266855 A1 | 10/2010 | Zukowski |
| 2011/0070387 A1 | 3/2011 | Schmidt |
| 2011/0129647 A1 | 6/2011 | Duke, Jr. |
| 2011/0288204 A1 | 11/2011 | Grablowitz |

FOREIGN PATENT DOCUMENTS

| | | |
|---|---|---|
| CA | 2096466 | 11/1993 |
| CA | 2640098 | 3/2010 |
| CN | 1322785 | 11/2001 |
| CN | 1401717 | 3/2003 |
| CN | 1817989 | 8/2006 |
| EP | 650988 | 5/1995 |
| EP | 806992 | 11/1997 |
| EP | 1033440 | 9/2000 |
| GB | 550022 | 12/1942 |
| JP | 2006-183336 | 7/2006 |
| JP | 2009-275071 | 11/2009 |
| WO | 00-57962 | 10/2000 |
| WO | WO 01-24888 | 4/2001 |
| WO | WO 2008-098213 | 8/2008 |
| WO | WO 2009-146227 | 12/2009 |
| WO | WO 2010-034109 | 4/2010 |
| WO | WO 2010-120617 | 10/2010 |
| WO | WO 2012/010558 A1 | 1/2012 |
| WO | WO 2012-161774 | 11/2012 |

OTHER PUBLICATIONS

STIC Search Report dated Jul. 5, 2016.*
International Search Report for PCT International Application No. PCT/US2013/044111, mailed on Aug. 9, 2013, 3 pages.

* cited by examiner

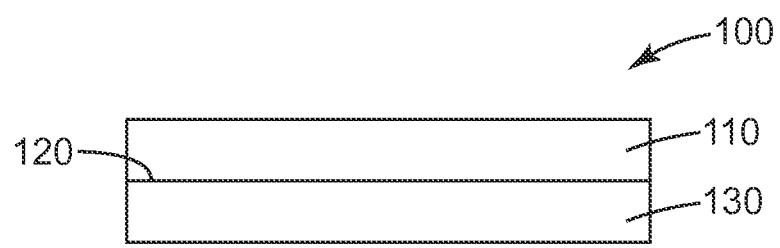

CURABLE POLYUREA FORMING COMPOSITION, METHOD OF MAKING, AND COMPOSITE ARTICLE

FIELD

The present disclosure broadly relates to curable compositions, methods of making curable compositions, and composite articles including cured curable compositions.

BACKGROUND

Polyureas are polymers derived from the reaction product of a polyisocyanate and a polyamine through step-growth polymerization. For use in protective coatings, the polyurea is crosslinked by using polyisocyanates and/or polyamines that have functionality greater than 2 (e.g., polyisocyanates with an average of >2 isocyanate group per polyisocyanate).

Polyureas' physical properties, ease of application, and ability to be used directly on steel, polyurethane foam, or mineral wool, make them suitable as anticorrosion sealants and coatings for use in oil and gas, potable water pipelines, waste water pipelines, steam lines, cooling systems, flooring, mining, and roofing.

Despite the availability of good quality polyurea resins, there remains a need for improved physical properties for many of the above applications.

SUMMARY

In one aspect, the present disclosure provides a curable composition comprising components:
a) at least one aliphatic polyisocyanate;
b) at least one aliphatic polyamine; and
c) from 8 to 17 percent by weight of at least one liquid compound, based on the total weight of components a), b) and c) combined, wherein each compound of said at least one liquid compound is independently represented by the formula:

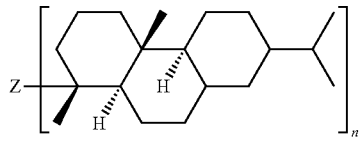

wherein Z represents an n valent organic group, and
n represents an integer $\geq 1$.

In another aspect, the present disclosure provides, a method of coating a substrate, the method comprising coating a curable composition onto a surface of a substrate, and at least partially curing the curable composition, wherein the curable composition comprises components:
a) at least one aliphatic polyisocyanate;
b) at least one aliphatic polyamine; and
c) from 8 to 17 percent by weight of at least one liquid compound, based on the total weight of components a), b) and c) combined, wherein each compound of said at least one liquid compound is independently represented by the formula:

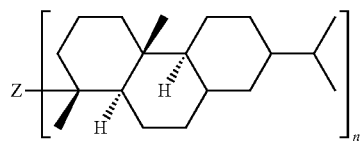

wherein Z represents an n valent organic group, and
n represents an integer $\geq 1$.

In yet another aspect, the present disclosure provides a composite article comprising a coating disposed on a substrate, wherein the
coating is prepared from components comprising:
a) at least one aliphatic polyisocyanate;
b) at least one aliphatic polyamine; and
c) from 8 to 17 percent by weight of at least one liquid compound, based on the total weight of components a), b) and c) combined, wherein each compound of said at least one liquid compound is independently represented by the formula:

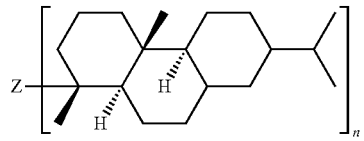

wherein Z represents an n valent organic group, and
n represents an integer $\geq 1$.

Advantageously and unexpectedly, inclusion of component c) in the curable composition improves physical properties (e.g., flexural modulus and tensile modulus) of the resulting polyurea after curing. Curable compositions according to the present disclosure are useful, for example, for those applications where strength and flexibility are important properties.

In some embodiments, curable compositions according to the present disclosure are suitable for application to internal pipeline surfaces so as to form an impervious lining suitable for contact with drinking water.

The features and advantages of the present disclosure will be further understood upon consideration of the detailed description as well as the appended claims.

BRIEF DESCRIPTION OF THE DRAWINGS

FIG. 1 is a schematic side view of an exemplary composite article according to the present disclosure.

In all cases, the disclosure is presented by way of representation and not limitation. It should be understood that numerous other modifications and embodiments can be devised by those skilled in the art, which fall within the scope and spirit of the principles of the disclosure. The figures may not be drawn to scale.

DETAILED DESCRIPTION

Curable compositions according to the present disclosure typically have relatively short open times before curing advances sufficiently that the at least partially cured composition cannot be practically handled. Accordingly, they may be stored in two-part form until just prior to use. For example, components a) and b) can be separated and incorporated into respective Part A and Part B compositions. Component c), and any additional components that may be present, are typically included in PART A, PART B, or both, although it may be supplied separately. Mixing PART A with PART B forms a curable composition according to the present disclosure, which typically begins to spontaneously react to formureylene (i.e., —NR—C(O)—NR'—) groups, wherein R and R' independently represent H or a monovalent organic group. Polymers containing ureylene groups are often referred to as polyureas. If the curable composition comprises other isocyanate reactive (e.g., —OH) or amine reactive components, the reacted coating may comprise other groups as well.

The curable composition comprises at least one aliphatic polyisocyanate. As used herein, the term "polyisocyanate" refers to any organic compound that has two or more reactive isocyanate (i.e., —N=C=O) groups in a single molecule such as, for example, diisocyanates, triisocyanates, and tetraisocyanates. Cyclic and/or linear polyisocyanate molecules may usefully be employed.

Exemplary aliphatic polyisocyanates include derivatives of hexamethylene-1,6-diisocyanate; 2,2,4-trimethylhexamethylene diisocyanate; isophorone diisocyanate; and 4,4'-dicyclohexylmethane diisocyanate. Reaction products and prepolymers of aliphatic polyisocyanates may be also be utilized as long as they contain a plurality of isocyanate groups.

Aliphatic polyisocyanates typically comprise one or more derivatives of hexamethylene-1,6-diisocyanate (HDI). In some embodiments, the aliphatic polyisocyanate is a derivative of isophorone diisocyanate. In some embodiments, the aliphatic polyisocyanate may comprise a uretdione, biuret, and/or trimer (e.g., isocyanurate) of HDI.

In some embodiments, the curable composition is substantially solvent-free (i.e., at least 95 percent by weight free of solvent) and/or substantially free of (i.e., less than 0.5 percent by weight) 1,6-hexanediisocyanate (HDI). Various solvent-free aliphatic polyisocyanate(s) are available. One type of HDI uretdione polyisocyanate, is available from Bayer Corp. USA, Pittsburgh, Pa. under the trade designation DESMODUR N 3400. Another HDI polyisocyanate is a trimer, reported to have a viscosity of about 1200 millipascal-seconds (mPa·s) at 23° C., which is available from Bayer under the trade designation DESMODUR N 3600. Such polyisocyanates typically have an isocyanate content of 20-25 percent by weight. Another polyisocyanate is an aliphatic prepolymer resin comprising ether groups, based on HDI, reported to have a viscosity of 2500 mPa·s at 23° C. is available from Bayer Corp. USA under the trade designation DESMODUR XP 2599. Yet another aliphatic polyisocyanate resin based on HDI is available from Bayer Corp. USA under the trade designation DESMODUR N3800. This material has an NCO content of 11 percent by weight and a viscosity of 6000 mPa·s at 23° C. Yet another aliphatic polyisocyanate resin based on HDI and isophorone diisocyanate is available from Bayer Corp. USA under the trade designation DESMODUR NZ1. This material has an NCO content of 20 percent by weight and a viscosity of 3000 mPa·s at 23° C.

Preferably, the curable composition comprises a mixture of an aliphatic polyisocyanate prepolymer having a viscosity of at least 2000 or 2500 mPa·s at 23° C. such as, for example, DESMODUR XP 2599, in combination with a lower viscosity polyisocyanate having a viscosity of no greater than 1500 mPa·s at 23° C. such as, for example, DESMODUR N 3600. The lower viscosity aliphatic polyisocyanate prepolymer is typically present at a weight ratio ranging from about 1:1 or 2:1 to 4:1 with a ratio of about 3:1 being preferred, although other ratios may also be used.

In another embodiment, the curable composition comprises a mixture of first aliphatic polyisocyanate prepolymer having a viscosity of at least 2000 or 2500 mPa·s at 23° C., such as, for example, DESMODUR XP 2599, in combination with a higher viscosity polyisocyanate, having a viscosity of at least 3000 mPa·s at 23° C. such as, for example, DESMODUR NZ1. The higher viscosity polyisocyanate is typically present at a weight ratio ranging from about 2:1 to 1:2 with a ratio of about 2:1 being preferred, although other ratios may also be used.

In yet another embodiment, the curable composition comprises a three-component mixture of aliphatic polyisocyanates. The three component mixture may comprise at least one trimer such as, for example, DESMODUR N 3600, and at least one aliphatic prepolymer resin comprising ether groups such as, for example, DESMODUR XP 2599.

In some embodiments, the curable composition is substantially free of (i.e., containing less than 0.5 percent by weight, preferably less than 0.1 percent by weight) nonaliphatic polyisocyanate-based amine-reactive resin(s) (e.g., aromatic polyisocyanates, monoisocyanates, and epoxy resins). For example, the curable composition is preferably free of aromatic polyisocyanates. The curable composition may be free of epoxy functional compounds and compounds containing unsaturated carbon-carbon bonds capable of undergoing Michael Addition with polyamines, (e.g., monomeric or oligomeric polyacrylates).

The curable composition comprises at least one aliphatic polyamine. As used herein, "polyamine" refers to compounds having at least two amino groups, each containing at least one active hydrogen (N—H group) selected from primary amino and secondary amino groups. In some embodiments, the polyamine(s) is/are present in PART B of the abovementioned two-part system. In some embodiments, PART B comprises or consists solely of one or more aliphatic polyamines.

Exemplary aliphatic polyamines include aliphatic primary polyamines, aliphatic secondary polyamines, and combinations thereof.

Exemplary aliphatic primary polyamines include poly(oxypropylene)diamines (e.g., as available under the trade designations JEFFAMINE D-230 and JEFFAMINE D-400 from Huntsman, The Woodlands, Tex.) poly(oxypropylene)triamines (preferably with a molecular weight in the range of 400-5000 g/mol), 1,4-diaminobutane, 1,2-ethylenediamine, 1,2-diaminopropane, and 1,3-diaminopropane.

Exemplary secondary amines include cyclic aliphatic secondary diamines, non-cyclic aliphatic secondary diamines. Additional exemplary secondary amines include aspartic ester polyamines.

In one embodiment, useful cyclic aliphatic secondary diamines comprise two, optionally substituted, hexyl groups bonded by a bridging group. Each of the hexyl rings comprises a secondary amine substituent. The aliphatic cyclic secondary diamines may be represented by the structure

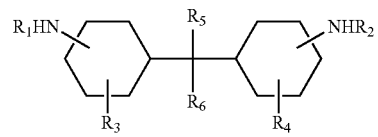

wherein $R_1$ and $R_2$ independently represent linear or branched alkyl groups, having 1 to 10 carbon atoms. $R_1$ and $R_2$ are typically the same alkyl group. Representative alkyl groups include methyl, ethyl, propyl, isopropyl, butyl, isobutyl, secondary butyl, tertiary butyl, and the various isomeric pentyl, hexyl, heptyl, octyl, nonyl, and decyl groups. Preferably, $R_1$ and $R_2$ contain at least three carbons, and the butyl group is particularly preferred (e.g., sec-butyl group). $R_3$, $R_4$, $R_5$ and $R_6$ independently represent hydrogen or a linear or branched alkyl group containing 1 to 5 carbon atoms. $R_3$ and $R_4$ are typically the same alkyl group. In some embodiments, $R_5$ and $R_6$ are hydrogen. Further, in some embodiments, $R_3$ and $R_4$ are methyl or hydrogen.

The substituents are represented such that the alkylamino group may be placed anywhere on the ring relative to the $CR_5R_6$ bridging group. Further, the $R_3$ and $R_4$ substituents may occupy any position relative to the alkylamino groups. In some embodiments, the alkylamino groups are at the 4,4'-positions relative to the $CR_5R_6$ bridging group. In some embodiments, $R_3$ and $R_4$ occupy the 3- and 3'-positions. Commercially available aliphatic cyclic secondary diamines having this structure include those available as CLEARLINK 1000 and CLEARLINK 3000 from Dorf Ketal Chemicals LLC, Stafford, Tex.

In another embodiment, useful aliphatic cyclic secondary diamines comprise a single hexyl ring. The aliphatic cyclic secondary diamine typically has the general structure:

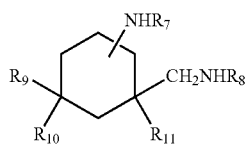

wherein $R_7$ and $R_8$ are independently linear or branched alkyl groups, having 1 to 10 carbon atoms or an alkylene group terminating with a —CN group. $R_7$ and $R_8$ are typically the same group. Representative alkyl groups include the same as those described above for $R_1$ and $R_2$. In one embodiment, $R_7$ and $R_8$ are alkyl groups having at least three carbons, such as isopropyl. In another embodiments, $R_7$ and $R_8$ are short chain (e.g., $C_1$-$C_4$) alkylene groups terminating with a —CN group.

$R_9$, $R_{10}$ and $R_{11}$ are independently hydrogen or a linear or branched alkyl group having 1 to 5 carbon atoms. $R_9$, $R_{10}$ and $R_{11}$ are typically the same alkyl group. In some embodiments, $R_9$, $R_{10}$ and $R_{11}$ are methyl or hydrogen. In one embodiment $R_9$, $R_{10}$ and $R_{11}$ are methyl groups.

The substituents are represented such that the alkylamino group —$NR_7$ may be placed anywhere on the ring relative to the —$CH_2NR_8$ group. In some embodiments, the alkylamino group is 2 or 3 positions away from the —$CH_2NR_8$ group. Preferably, —$CH_2NR_8$ group is two positions away from the —$NR_7$ group on the cyclohexane ring. A commercially available cycloaliphatic secondary diamine having this structure is available as JEFFLINK 754 from Huntsman, The Woodlands, Tex.

Useful aliphatic cyclic secondary diamines can be prepared by reaction of isophorone diamine and a compound having a Michael acceptor group that reduces the nucleophilicity of the resulting secondary amine groups. Representative Michael acceptors include acrylonitrile and α,β-unsaturated carbonyl compounds, with acrylonitrile typically preferred. In some embodiments, the alkylene group between the terminal —CN group and the amine group has at least two carbon atoms. Commercially available aliphatic cyclic secondary diamines having this structure include HXA CE 425 from Hanson Group LLC., Alpharetta, Ga., and BAXXODUR PC-136 from BASF, Florham Park, N.J.

Exemplary non-cyclic aliphatic secondary diamines include, e.g., N,N'-bis(3',3'-dimethylbutan-2-yl)-1,6-diaminohexane (e.g., as available under the trade designation ETHACURE 90, Albemarle Corporation, Baton Rouge, La.).

Aspartic ester polyamines are polyamines with secondary amino groups that can be produced, for example, by addition of primary aliphatic diamines to maleic or fumaric acid dialkyl esters, or by addition of primary aliphatic amines to unsaturated oligoesters or polyesters. Useful aspartic ester polyamines include, for example, aspartic ester polyamines have the general formula

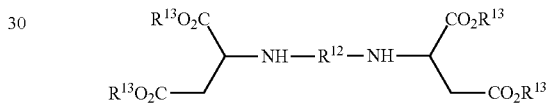

wherein $R^{12}$ is a divalent organic group (e.g., having up to 40 carbon atoms), each $R^{12}$ is independently an organic group inert toward isocyanate groups at temperatures of 100° C. or less, and each $R^{13}$ independently represents a lower alkyl group having 1 to 4 carbon atoms. For example, $R^{13}$ may be methyl, ethyl, propyl, or butyl.

Preferably, $R^{12}$ represents a divalent aliphatic group (preferably having 1 to 20 carbon atoms), which can be, for example, branched, unbranched, or cyclic. More preferably, $R^{12}$ is selected from divalent hydrocarbon groups obtained by the removal of the amino groups from 1,4-diaminobutane, 1,6-diaminohexane, 2,2,4- and 2,4,4-trimethyl-1,6-diaminohexane, 1-amino-3,3,5-trimethyl-5-aminomethylcyclohexane, 4,4'-diamino-dicyclohexylmethane or 3,3-dimethyl-4,4'-diamino-dicyclohexylmethane. In some embodiments, $R^{12}$ a branched $C_4$ to $C_{12}$ alkylene group.

Suitable aspartic ester amine resins are commercially available from Bayer Corp. under the trade designations DESMOPHEN NH 1420, DESMOPHEN NH 1520, and DESMOPHEN NH 1220. DESMOPHEN NH 1420 resin is substantially composed of the following compound

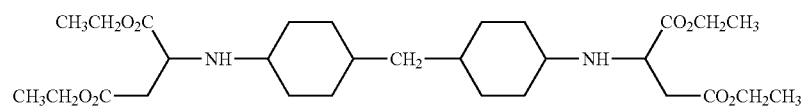

DESMOPHEN NH1520 resin is substantially composed of the following compound

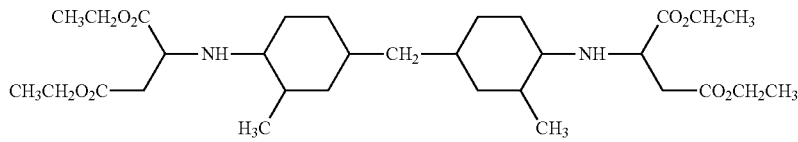

DESMOPHEN NH 1220 is substantially composed of the following compound

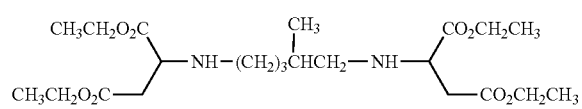

The inclusion of aspartic ester polyamines, wherein $R^{12}$ is a branched or unbranched group lacking cyclic structures and having less than 12, 10, 8, or 6 carbon atoms, is typically preferred for faster film set times of 2 to 5 minutes. The inclusion of an aspartic ester polyamine wherein $R^{12}$ comprises unsubstituted cyclic structures can be employed to extend the film set time to 5 to 10 minutes. The inclusion of an aspartic ester polyamine wherein $R^{12}$ comprises substituted cyclic structures can even further extend the film set time. Typically, such aspartic ester polyamines are employed at only small concentrations is combination with another aspartic ester polyamine that provides faster film set times, as just described, although this is not a requirement.

The aliphatic polyamine(s) may be combined with one or more aromatic polyamines for the purposes of adjusting the set time of the composition and adjusting the mechanical properties of the cured composition. In some embodiments, the coating composition further comprises at least one aromatic polyamine that is a solid at ambient temperature (25° C.). Suitable solid aromatic polyamines include alkyl anilines such as 4,4'-methylenebis(2-isopropyl-6-methylaniline) commercially available from Lonza under the trade designation LONZACURE M-MIPA; 4,4'-methylenebis(2,6-diisopropylaniline) commercially available from Lonza under the trade designation LONZACURE M-DIPA; 4,4'-methylenebis(2-ethyl-6-methylaniline); and 4,4'-methylenebis(3-chloro-2,6-diethylaniline) commercially available from Lonza, Basel, Switzerland under the trade designation LONZACURE MCDEA.

The aspartic ester polyamine and aromatic polyamine may be chosen such that the aromatic polyamine is dissolved in the liquid aspartic ester polyamine. aspartic ester polyamines, such as DESMOPHEN NH 1220, can exhibit high solvency for solid aromatic amines. In some embodiments, up to about 50 percent by weight of a solid aromatic amine such as an alkylaniline can be dissolved in the aspartic ester polyamine. In other embodiments, the second part comprises at least about 5 or 10 percent by weight and typically no greater than 15 percent by weight of a solid aromatic amine or a cycloaliphatic secondary amine.

A wide range of formulations are possible, such as exemplified in the forthcoming examples, depending on the desired mechanical properties and set time of the coating.

Curable compositions according to the present disclosure include from 8 to 17 percent by weight of at least one liquid compound, based on the total weight of components a), b) and c) combined. In some embodiments, the curable compositions include from 9 to 16 percent by weight of at least one liquid compound, preferably from 10 to 15 percent by weight of the at least one liquid compound, based on the total weight of components a), b) and c) combined.

Each compound of the at least one liquid compound is independently represented by the formula:

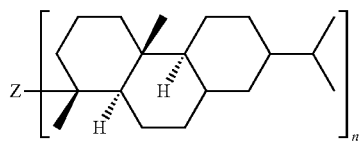

wherein Z represents an n valent organic group, and n represents an integer ≥1 (e.g., 1, 2, 3, 4, 5, or 6). In some embodiments, Z has from one to 30 carbon atoms. Z may comprise, for example, alkylene, oxycarbonyl, carbonyloxy, aminocarbonyl, carbonylamino, arylene, oxygen, sulfur, alkylamino, or a combination thereof. In some embodiments, Z represents —$CH_2OH$ or —$C(=O)$ $OCH_2CH_2OCH_2CH_2OCH_2CH_2OC(=O)$—. Commercially available liquid compounds c) include hydroabietyl alcohol and its derivatives such as, for example, ABITOL E hydroabietyl alcohol and STAYBELITE ESTER 3-E ester of hydrogenated resins marketed by Eastman Chemical Co., Kingsport, Tenn.

The first and/or second part may comprise various additives. For example, pigments, dispersing and grinding aids, water scavengers, thixotropes, defoamers, etc. can be added to improve the manufacturability, the properties during application and/or the shelf-life.

The stoichiometry of the polyurea reaction is based on a ratio of equivalents of isocyanate (e.g. modified isocyanate and excess isocyanate) of the first component to equivalents of amine of the second component. The first and second components are reacted at a stoichimetric ratio of at least about 1:1. Typically, the NCO equivalent ratio of aliphatic polyamine to aliphatic polyisocyanate (i.e., isocyanate equivalents/amine equivalents) is in a ratio of from 0.5 to 2.0, preferably in a ratio of from 0.8 to 1.5, although other ratios may also be used.

As a two-part formulation, PART A is preferably combined with PART B at a volume ratio of about 1:1, although this is not a requirement. PART A and PART B are preferably both liquids at temperatures ranging from 5° C. to 25° C. Preferably, both PART A and PART B are substantially free of any volatile solvent. That is to say, solidification of the system is not necessitated by drying or evaporation of solvent from either part of the system. To further lower the viscosity, one or both parts can be heated. Further, the coating composition has a useful shelf life of at least 6 months, more preferably, at least one year, and most preferably, at least two years.

Curable compositions according to the present disclosure are useful, for example, for coating a substrate. Typically, this is done by combining two-or more components (e.g., PART A and PART B) in a spray head and then spraying the curable composition (e.g., in the case of highly reactive systems), although for less reactive curable compositions other coating techniques may be suitable (e.g., a brush, spray gun, knife coater, or roller).

Referring now to FIG. 1, exemplary composite article 100 according to the present disclosure comprises coating 110 disposed on surface 120 of substrate 130. Coating 110 is prepared from a curable composition according to the present disclosure, for example, by at least partial curing of the curable composition, such curing including at least partial reaction of components a), b), and optionally c).

Suitable substrates may comprise one or more metal (e.g., steel), glass, fabric (e.g., geotextile fabric), ceramic, concrete, wood, plastic, earth. or a combination thereof. Curable compositions according to the present disclosure are suitable for use to generate pipe coatings (e.g., linings and/or exterior coatings of water distribution pipes). The curable composition may be applied directly to the surface of the substrate (e.g. internal surface and/or external surface of a pipe) without a primer layer applied to the surface.

The curable composition can be prepared by combining the constituent components, for example, using a mechanical stirrer, by hand stirring (e.g., using tongue depressor), shaking, or any other suitable technique. For rapid cure compositions spray mixing/coating techniques may be useful. This can be done using various spray coating techniques. Typically, the amine component (Part B) and the isocyanate component (Part A) are applied using a spraying apparatus that allows the components to combine immediately prior to exiting the apparatus.

Part A (e.g., including component a)) and Part B (e.g., including components b) and any additional components of the curable composition) are fed independently, e.g., by flexible hoses, to a spraying apparatus capable of being propelled through an existing pipeline to be renovated. For example, a remote controlled vehicle, such as described in U.S. Pat. Appl. Publ. No. 2006/0112996 a1 (Poole), may enter the pipeline to convey the spraying apparatus through the pipeline. The apparatus may heat the two parts of the system prior to application to the pipeline interior and mixes the two parts immediately before applying the mixture to the interior surface of the pipeline. The mixture of the two parts cures on the interior surface of the pipeline to form a (e.g. monolithic) water impervious lining. Such linings may be formed when the pipeline is initially laid, or after a period of use when the pipeline itself begins to deteriorate. Notably, the composition described herein can be applied at a caliper of at least 5 mm in a single pass forming a cured continuous lining.

A variety of spray systems may be used in conjunction with curable compositions according to the present disclosure, for example, as described in the art. In some embodiments, a heated airless spray apparatus, such as a centrifugal spinning head may be used. An airless, impingement mixing spray system generally includes the following components: a proportioning section which meters the two components and increases the pressure to above about 1500 psi (10.34 MPa); a heating section to raise the temperatures of the two components (preferably, independently) to control viscosity; and an impingement spray gun which combines the two components and allows mixing just prior to atomization. In other embodiments, a heated air vortex spray apparatus can be used to apply the coating.

In some embodiments and in particular when the liquid mixture is applied by spraying, the first and second part typically each have a (Brookfield) viscosity ranging from about 10 mPa·s to about 60000 mPa·s, using spindle 6 at the temperature at which the liquid mixture is applied. The temperature at which the liquid mixture is applied typically ranges from about 15° C. to 50° C.

Viscosity behavior of the each of the two components (i.e., PART A and PART B) is important for two part spray-coating processes. With impingement mixing, the two parts should be as close as possible in viscosity at high shear rates to allow adequate mixing and even cure. The plural component static mix/spray system appears to be more forgiving of viscosity differences between the two components. Characterization of viscosities as functions of shear rate and temperature can help with decisions as to starting point for temperatures and pressures of the coatings in the two part spray equipment lines.

SELECT EMBODIMENTS OF THE PRESENT DISCLOSURE

In a first embodiment, the present disclosure provides a curable composition comprising components:
 a) at least one aliphatic polyisocyanate;
 b) at least one aliphatic polyamine; and
 c) from 8 to 17 percent by weight of at least one liquid compound, based on the total weight of components a), b) and c) combined, wherein each compound of said at least one liquid compound is independently represented by the formula:

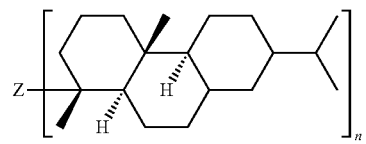

wherein Z represents an n valent organic group, and n represents an integer ≥1.

In a second embodiment, the present disclosure provides a curable composition according to the first embodiment, wherein Z represents —CH$_2$OH or —C(=O)OCH$_2$CH$_2$OCH$_2$CH$_2$OCH$_2$CH$_2$C(=O)—.

In a third embodiment, the present disclosure provides a curable composition according to the first or second embodiment, wherein said at least one aliphatic polyamine comprises an aspartic ester.

In a fourth embodiment, the present disclosure provides a curable composition according to the first or second embodiment, wherein said at least one aliphatic polyamine includes an aliphatic polyamine represented by the formula

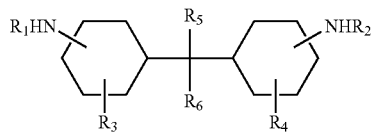

wherein $R_1$ and $R_2$ independently represent an alkyl group having 1 to 10 carbon atoms, and $R_3$, $R_4$, $R_5$, and $R_6$ independently represent hydrogen or an alkyl group having 1 to 5 carbon atoms.

In a fifth embodiment, the present disclosure provides a curable composition according to the fourth embodiment, wherein $R_1$ and $R_2$ are independently alkyl groups comprising at least 2 carbon atoms.

In a sixth embodiment, the present disclosure provides a curable composition according to the fourth or fifth embodiment, wherein $R_3$ and $R_4$ are methyl or hydrogen.

In a seventh embodiment, the present disclosure provides a curable composition according to any one of the fourth to sixth embodiments, wherein $R_5$ and $R_6$ are hydrogen.

In an eighth embodiment, the present disclosure provides a curable composition according to the first or second embodiment, wherein each said at least one aliphatic polyamine has the general formula:

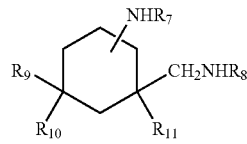

wherein $R_7$ and $R_8$ independently represent an alkyl group having from 1 to 10 carbon atoms, or a cyanoalkyl group having from 1 to 10 carbon atoms, and wherein $R_9$, $R_{10}$, and $R_{11}$ are independently hydrogen or an alkyl group having from 1 to 5 carbon atoms.

In a ninth embodiment, the present disclosure provides a curable composition according to the eighth embodiment, wherein $R_7$ and $R_8$ are independently alkyl groups comprising at least 3 carbon atoms.

In a tenth embodiment, the present disclosure provides a curable composition according to the eighth or ninth embodiment, wherein $R_9$, $R_{10}$ and $R_{11}$ are independently an alkyl group having from 1 to 5 carbon atoms.

In an eleventh embodiment, the present disclosure provides a curable composition according to the eighth or ninth embodiment, wherein $R_9$, $R_{10}$ and $R_{11}$ are independently hydrogen, methyl, or isopropyl.

In an twelfth embodiment, the present disclosure provides a curable composition according to any one of the first to eleventh embodiments, wherein the at least one aliphatic polyisocyanate comprises a trimer of 1,6-hexanediisocyanate.

In an thirteenth embodiment, the present disclosure provides a method of coating a substrate, the method comprising coating a curable composition onto a surface of a substrate, and at least partially curing the curable composition, wherein the curable composition comprises components:
a) at least one aliphatic polyisocyanate;
b) at least one aliphatic polyamine; and
c) from 8 to 17 percent by weight of at least one liquid compound, based on the total weight of components a), b) and c) combined, wherein each compound of said at least one liquid compound is independently represented by the formula:

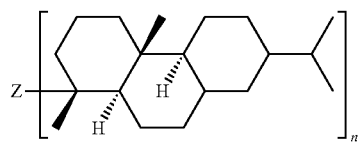

wherein Z represents an n valent organic group, and n represents an integer $\geq 1$.

In a fourteenth embodiment, the present disclosure provides a method according to the thirteenth embodiment, wherein Z represents —CH$_2$OH or —C(=O)OCH$_2$CH$_2$OCH$_2$CH$_2$OCH$_2$CH$_2$C(=O)—.

In a fifteenth embodiment, the present disclosure provides a method according to the thirteenth or fourteenth embodiment, wherein said at least one aliphatic polyamine comprises an aspartic ester.

In a sixteenth embodiment, the present disclosure provides a method according to the thirteenth or fourteenth embodiment, wherein said at least one aliphatic polyamine includes an aliphatic polyamine represented by the general formula

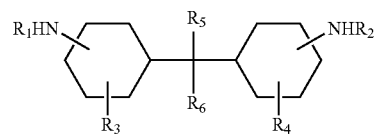

wherein $R_1$ and $R_2$ independently represent an alkyl group having 1 to 10 carbon atoms, and $R_3$, $R_4$, $R_5$, and $R_6$ independently represent hydrogen or an alkyl group having 1 to 5 carbon atoms.

In a seventeenth embodiment, the present disclosure provides a method according to the sixteenth embodiment, wherein $R_1$ and $R_2$ are independently alkyl groups comprising at least 2 carbon atoms.

In an eighteenth embodiment, the present disclosure provides a method according to the sixteenth or seventeenth embodiment, wherein $R_3$ and $R_4$ are methyl or hydrogen.

In a nineteenth embodiment, the present disclosure provides a method according to any one of the sixteenth to eighteenth embodiments, wherein $R_5$ and $R_6$ are hydrogen.

In a twentieth embodiment, the present disclosure provides a method according to the thirteenth or fourteenth embodiment, wherein each said at least one aliphatic polyamine has the general formula:

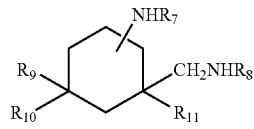

wherein $R_7$ and $R_8$ independently represent an alkyl group having from 1 to 10 carbon atoms, or a cyanoalkyl group having from 1 to 10 carbon atoms, and wherein $R_9$, $R_{10}$, and $R_{11}$ are independently hydrogen or an alkyl group having from 1 to 5 carbon atoms. In a twenty-first embodiment, the present disclosure provides a method according to the twentieth embodiment, wherein $R_7$ and $R_8$ are independently alkyl groups comprising at least 3 carbon atoms.

In a twenty-second embodiment, the present disclosure provides a method according to the twentieth or twenty-first embodiment, wherein $R_9$, $R_{10}$, and $R_{11}$ are independently an alkyl group having from 1 to 5 carbon atoms.

In a twenty-third embodiment, the present disclosure provides a method according to the twentieth or twenty-first embodiment, wherein $R_9$, $R_{10}$, and $R_{11}$ are independently hydrogen, methyl, or isopropyl.

In a twenty-fourth embodiment, the present disclosure provides a method according to any one of the thirteenth to twenty-third embodiments, wherein the at least one aliphatic polyisocyanate comprises a trimer of 1,6-hexanediisocyanate.

In a twenty-fifth embodiment, the present disclosure provides a composite article comprising a coating disposed on a substrate, wherein the coating is prepared from components comprising:

a) at least one aliphatic polyisocyanate;

b) at least one aliphatic polyamine; and c) from 8 to 17 percent by weight of at least one liquid compound, based on the total weight of components a), b) and c) combined, wherein each compound of said at least one liquid compound is independently represented by the formula:

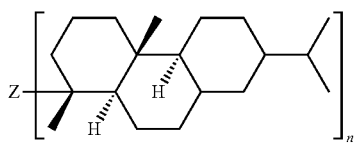

wherein Z represents an n valent organic group, and n represents an integer $\geq 1$.

In a twenty-sixth embodiment, the present disclosure provides a composite article according to the twenty-fifth embodiment, wherein Z represents —$CH_2OH$ or —$C(=O)$ $OCH_2CH_2OCH_2CH_2OCH_2CH_2C(=O)$—.

In a twenty-seventh embodiment, the present disclosure provides a composite article according to the twenty-fifth or twenty-sixth embodiment, wherein said at least one aliphatic polyamine comprises an aspartic ester.

In a twenty-eighth embodiment, the present disclosure provides a composite article according to the twenty-fifth or twenty-sixth embodiment, wherein said at least one aliphatic polyamine includes an aliphatic polyamine represented by the general formula

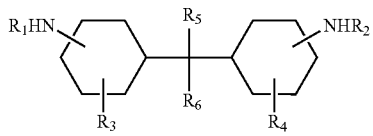

wherein $R_1$ and $R_2$ independently represent an alkyl group having 1 to 10 carbon atoms, and $R_3$, $R_4$, $R_5$, and $R_6$ independently represent hydrogen or an alkyl group having 1 to 5 carbon atoms.

In a twenty-ninth embodiment, the present disclosure provides a composite article according to the twenty-eighth embodiment, wherein $R_1$ and $R_2$ are independently alkyl groups comprising at least 2 carbon atoms.

In a thirtieth embodiment, the present disclosure provides a composite article according to the twenty-eighth or twenty-ninth embodiment, wherein $R_3$ and $R_4$ are methyl or hydrogen.

In a thirty-first embodiment, the present disclosure provides a composite article according to any one of the twenty-eighth to thirtieth embodiments, wherein $R_5$ and $R_6$ are hydrogen.

In a thirty-second embodiment, the present disclosure provides a composite article according to the twenty-fifth or twenty sixth embodiment, wherein each said at least one aliphatic polyamine has the general formula:

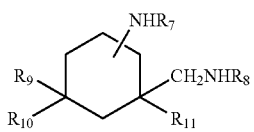

wherein $R_7$ and $R_8$ independently represent an alkyl group having from 1 to 10 carbon atoms, or a cyanoalkyl group having from 1 to 10 carbon atoms, and wherein $R_9$, $R_{10}$, and $R_{11}$ are independently hydrogen or an alkyl group having from 1 to 5 carbon atoms.

In a thirty-third embodiment, the present disclosure provides a composite article according to the thirty-second embodiment, wherein $R_7$ and $R_8$ are independently alkyl groups comprising at least 3 carbon atoms.

In a thirty-fourth embodiment, the present disclosure provides a composite article according to the thirty-second or thirty-third embodiment, wherein $R_9$, $R_{10}$, and $R_{11}$ are independently hydrogen or an alkyl group having from 1 to 5 carbon atoms.

In a thirty-fifth embodiment, the present disclosure provides a composite article according to the thirty-second or thirty-third embodiment, wherein $R_9$, $R_{10}$, and $R_{11}$ are independently hydrogen, methyl, or isopropyl.

In a thirty-sixth embodiment, the present disclosure provides a composite article according to any one of the twenty-fifth to thirty-fifth embodiments, wherein the at least one aliphatic polyisocyanate comprises a trimer of 1,6-hexanediisocyanate.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Abbreviations and descriptions of materials used in the Examples are given in Table 1 (below).

TABLE 1

| ABBREVIATION | DESCRIPTION |
|---|---|
| PI-1 | Low viscosity, solvent-free polyfunctional polyisocyanate resin based on hexamethylene diisocyanate (HDI). NCO content 23.0%. Viscosity 1200 mPa · s @23° C. Commercially available from Perstorp Coatings, Inc., Toledo, Ohio as TOLONATE HDT-LV |
| PA-1 | Solvent-free polyfunctional aspartic ester polyamine resin, commercially available from Bayer MaterialScience LLC, Pittsburgh, Pennsylvania as DESMOPHEN NH 1420 |
| PA-2 | Aliphatic cyclic diamine chain extender commercially available from the Hanson Group LLC, Alpharetta, Georgia as HXA CE 425 |
| PA-3 | Light-stable, aliphatic, cyclic, secondary diamine, commercially available from Dorf Ketal Chemicals LLC, Stafford, Texas as Clearlink 1000 |
| MM-1 | High molecular weight, primary, monohydric hydroabietyl alcohol derived from rosin acids that have been hydrogenated to reduce unsaturation, commercially available from Eastman Chemical, Kingsport, Tennessee as ABITOL E |
| MM-2 | Ester of high molecular weight, primary, monohydric hydroabietyl alcohol derived from rosin acids that have been hydrogenated to reduce unsaturation, commercially available |

TABLE 1-continued

| ABBRE-VIATION | DESCRIPTION |
|---|---|
| | from Eastman Chemical, Kingsport, Tennessee as STAYBELITE ESTER 3-E |
| MM-3 | Liquid aliphatic/aromatic hydrocarbon resin with low volatility and unimodal molecular weight distribution, commercially available from ExxonMobil Chemical, Houston, Texas as ESCOREZ 2520 |
| DM-1 | Hollow glass microspheres made from a water resistant and chemically-stable soda-lime borosilicate glass, commercially available from 3M Company, St. Paul, Minnesota as GLASS BUBBLES K37 |

Test Methods

Flexural Modulus and Strength ASTM D790-07

Flexural modulus and strength tests were run according to test method ASTM D790-07 "Standard Test Methods for Flexural Properties of Unreinforced and Reinforced Plastics and Electrical Insulating Materials." An Instron test station (Model II22, equipped with a 5 kN load cell, obtained from Instron, Norwood, Mass.) was used along with Bluehill software (obtained from Instron) to report both values. The test specimens were 120 mm×10 mm×4 mm injection molded bars (closed TEFLON fluoropolymer molds or open silicone molds). The support span was 64 mm and the crosshead speed was 1.7 mm/min.

Comparative Examples C1-C4

Comparative Example C1 compositions were prepared by mixing an isocyanate-containing component with an amine-containing component. The amine-containing component was prepared by combining 22.00 grams (g) PA-1 and 1.94 g MM-3 in a small plastic cup for use in a 150 DAC SPEEDMIXER dual asymmetric centrifuge mixer obtained from FlackTek, Inc Landrum, S.C. The cup was placed in the mixer and mixed at 3500 rounds-per-minute (rpm) for 5 minutes or until homogeneous mixtures were obtained.

The isocyanate-containing component was then added to the amine-containing component using a syringe after weighing the delivered amount (14.43 g PI-1) by difference so that the stoichiometric ratio of the amine to isocyanate was 1.0. The mixture vessel was then placed in a 150 DAC SPEEDMIXER dual asymmetric centrifuge mixer and mixed for 30 seconds at 2750 rpm. Mixtures were poured into a silicone mold to generate parts having dimensions suitable for flexural testing. The parts were allowed to cure for 16 hrs, removed from the mold and placed in a desiccator for 7 days. Flexural properties were measured in accordance to ASTM D790-07 as described above, and are reported in Table 2.

Comparative Examples C2-C4 compositions were prepared in the same manner as Comparative Example C1, except that the amine-containing component was prepared by adding 22.00 g PA-1 and 4.06 g MM-3 for Comparative Example C2, 22.00 g PA-1 and 15.65 g MM-3 for Comparative Example 3, and 22.00 g PA-1 for Comparative Example 4.

Flexural properties were measured in accordance to ASTM D790-07 as described above, and are reported in Table 2.

Examples 1-2 and Comparative Example C7

Examples 1-2 were prepared in the same manner as Comparative Example 1, except that the amine-containing component was prepared by combining 22.00 g PA-1 and 1.92 g MM-1 for Example 1, 22.00 g PA-1 and 4.06 g MM-1 for Example 2, and 22.00 g PA-1 and 15.65 g MM-1 for Comparative Example C7, in a small plastic cup and mixing in a 150 DAC SPEEDMIXER dual asymmetric centrifuge mixer at 2750 rpm for 5 minutes or until homogeneous mixtures were obtained.

Flexural properties of Examples 1-2 and Comparative Example C7 were measured in accordance to ASTM D790-07 as described above, and are reported in Table 2.

Examples 4-5, and Comparative Examples C5-C6

Examples 4-7 were prepared in the same manner as Comparative Example C1, except as noted below.

The amine-containing component was prepared by combining 22.00 g PA-1 and 4.06 g MM-1 for Example 4, 22.00 g PA-1 and 6.43 g MM-1 for Example 5, and 22.00 g PA-1 and 9.11 g MM-1 for Comparative Example C5, and 22.00 g PA-1 and 12.15 g MM-1 for Comparative Example C6.

The isocyanate-containing component was then added to the amine-containing component using a syringe after weighing the delivered amount (14.43 g PI-1) by difference so that the stoichiometric ratio of the amine to isocyanate was 1.0. The mixture vessel was then placed in a 150 DAC SPEEDMIXER dual asymmetric centrifuge mixer and mixed for 15 seconds at 2750 rpm. Mixtures were poured into a silicone mold to generate parts having dimensions suitable for flexural testing. The parts were allowed to cure for 16 hrs, removed from the mold and placed in a desiccator for 7 days.

Flexural properties of Examples 4-5 and Comparative Examples C5-C6 were measured in accordance to ASTM D790-07 as described above, and are reported in Table 2.

Examples 5-6 and Comparative Example C8

Examples 8-10 were prepared in the same manner as Example 1 except that the amine-containing component was prepared by combining 22.00 g PA-1 and 1.92 g MM-2 for Example 8, 22.00 g PA-1 and 4.06 g MM-2 for Example 9, and 22.00 g PA-1 and 15.65 g MM-2 for Comparative Example C8.

Flexural properties of Examples 5-6 and Comparative Example C8 were measured in accordance to ASTM D790-07 as described above, and are reported in Table 2 (below), wherein "MPa" refers to megapascals.

TABLE 2

| EXAMPLE | PERCENT BY WEIGHT OF LIQUID COMPONENT(S) BASED ON THE TOTAL WEIGHT OF COMPONENTS A), B) AND C) COMBINED | AVERAGE FLEXURAL MODULUS, MPa | FLEXURAL MODULUS STANDARD DEVIATION, MPa | AVERAGE FLEXURAL STRESS, MPa | AVERAGE FLEXURAL STRESS STANDARD DEVIATION, MPa |
|---|---|---|---|---|---|
| C1 | 5% MM-3 | 1926.4 | 65.8 | 71.1 | 1.3 |
| C2 | 10% MM-3 | 1720.8 | 48.9 | 64.7 | 1.0 |

TABLE 2-continued

| EXAMPLE | PERCENT BY WEIGHT OF LIQUID COMPONENT(S) BASED ON THE TOTAL WEIGHT OF COMPONENTS A), B) AND C) COMBINED | AVERAGE FLEXURAL MODULUS, MPa | FLEXURAL MODULUS STANDARD DEVIATION, MPa | AVERAGE FLEXURAL STRESS, MPa | AVERAGE FLEXURAL STRESS STANDARD DEVIATION, MPa |
|---|---|---|---|---|---|
| C3 | 30% MM-3 | 1069.4 | 49.7 | 41.1 | 0.3 |
| C4 | 0% MM-1 | 1944.9 | 19.8 | 69.3 | 1.9 |
| C5 | 20% MM-1 | 1641.7 | 56.2 | 66.4 | 0.7 |
| C6 | 25% MM-1 | 1369.9 | 49.0 | 54.8 | 0.9 |
| C7 | 30% MM-1 | 732.0 | 26.2 | 31.2 | 0.5 |
| C8 | 30% MM-2 | 23.8 | 2.3 | 0.8 | 0.04 |
| 1 | 5% MM-1 | 1947.3 | 68.3 | 76.4 | 1.2 |
| 2 | 10% MM-1 | 2128.0 | 48.0 | 79.6 | 1.4 |
| 3 | 10% MM-1 | 2220.6 | 16.0 | 78.3 | 4.0 |
| 4 | 15% MM-1 | 2073.3 | 24.2 | 76.1 | 0.5 |
| 5 | 5% MM-2 | 1939.6 | 87.7 | 72.5 | 2.6 |
| 6 | 10% MM-2 | 2059.3 | 73.2 | 76.6 | 1.7 |

Example 7

Example 7 was prepared in the same manner as Comparative Example C5. The amine-containing component was prepared by adding 18.23 g PA-3 and 4.79 g MM-1 to a small plastic cup for use in a 150 DAC SPEEDMIXER dual asymmetric centrifuge mixer. The cup was placed in the mixer and mixed at 3500 rpm for 5 minutes or until mixture was homogeneous. The mixture was then added to a barrel of a 400 mL 1:1 volume ratio dual-cartridge syringe.

The isocyanate-containing component was prepared by adding 22.78 g PI-1 and 2.16 g DM-1 to a small plastic cup for use in a 150 DAC SPEEDMIXER dual asymmetric centrifuge mixer. The cup was placed in the mixer and mixed at 1750 rpm for 5 minutes or until mixture was homogeneous. The mixture was then added to the remaining barrel of the dual cartridge syringe.

Parts were generated by dispensing the cartridge using a pneumatic cartridge dispenser or mechanically driven cartridge dispensing system through a 5/16 inch (0.79 cm), 32 element static mixer made of commercially available static mixer elements such as STATOMIX MC 08-32 (available from Brandywine Materials, LLC Burlington, Mass.) into a 2-part closed fluoropolymer mold to generate parts having dimensions suitable for flexural testing in accordance to ASTM D790. Samples were removed from the mold after 5 minutes and then placed in an 80° C. oven for 45 minutes.

Example 8

Example 8 was prepared in the same manner as Example 7, except for differences noted below.

The amine-containing component was prepared by combining 19.43 g PA-2 and 5.38 g MM-1 to a small plastic cup for use in a 150 DAC SPEEDMIXER dual asymmetric centrifuge mixer. The cup was placed in the mixer and mixed at 3500 rpm for 5 minutes or until mixture was homogeneous. The mixture was then added to a barrel of a 400 mL 1:1 volume ratio dual cartridge syringe.

The isocyanate-containing component was prepared by filling the remaining barrel with PI-1.

Parts were generated in the same manner as in Example 7.

Other modifications and variations to the present disclosure may be practiced by those of ordinary skill in the art, without departing from the spirit and scope of the present disclosure, which is more particularly set forth in the appended claims. It is understood that aspects of the various embodiments may be interchanged in whole or part or combined with other aspects of the various embodiments. All cited references, patents, or patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. A curable composition comprising components:
   a) at least one aliphatic polyisocyanate;
   b) at least one aliphatic polyamine; and
   c) from 8 to 17 percent by weight of at least one liquid compound, based on the total weight of components a), b) and c) combined, wherein each compound of said at least one liquid compound is independently represented by the formula:

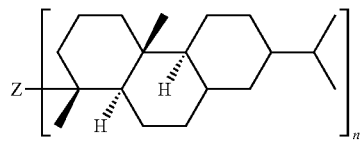

wherein Z represents an n-valent organic group, and n represents an integer ≥1.

2. The curable composition of claim 1, wherein Z represents —CH$_2$OH or —C(=O)OCH$_2$CH$_2$OCH$_2$CH$_2$OCH$_2$CH$_2$OC(=O)—.

3. The curable composition of claim 1, wherein said at least one aliphatic polyamine comprises an aspartic ester.

4. The curable composition of claim 1, wherein said at least one aliphatic polyamine includes an aliphatic polyamine represented by the formula

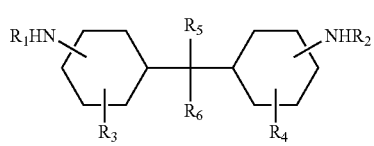

wherein $R_1$ and $R_2$ independently represent an alkyl group having 1 to 10 carbon atoms, and $R_3$, $R_4$, $R_5$, and $R_6$ independently represent hydrogen or an alkyl group having 1 to 5 carbon atoms.

5. The curable composition of claim 4, wherein $R_1$ and $R_2$ are independently alkyl groups comprising at least 2 carbon atoms.

6. The curable composition of claim 1, wherein each said at least one aliphatic polyamine has the general formula:

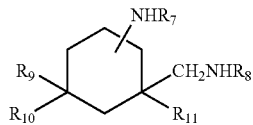

wherein $R_7$ and $R_8$ independently represent an alkyl group having from 1 to 10 carbon atoms, or a cyanoalkyl group having from 1 to 10 carbon atoms, and wherein $R_9$, $R_{10}$, and $R_{11}$ are independently hydrogen or an alkyl group having from 1 to 5 carbon atoms.

7. The curable composition of claim 1, wherein the at least one aliphatic polyisocyanate comprises a trimer of 1,6-hexanediisocyanate.

8. A method of coating a substrate, the method comprising coating a curable composition onto a surface of a substrate, and at least partially curing the curable composition, wherein the curable composition comprises components:
  a) at least one aliphatic polyisocyanate;
  b) at least one aliphatic polyamine; and
  c) from 8 to 17 percent by weight of at least one liquid compound, based on the total weight of components a), b) and c) combined, wherein each compound of said at least one liquid compound is independently represented by the formula:

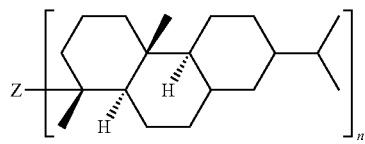

wherein Z represents an n-valent organic group, and n represents an integer $\geq 1$.

9. The method of claim 8, wherein Z represents —CH$_2$OH or —C(=O)OCH$_2$CH$_2$OCH$_2$CH$_2$OCH$_2$CH$_2$OC(=O)—.

10. The method of claim 8, wherein said at least one aliphatic polyamine comprises an aspartic ester.

11. The method of claim 8, wherein said at least one aliphatic polyamine includes an aliphatic polyamine represented by the general formula

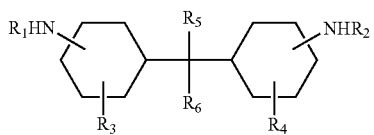

wherein $R_1$ and $R_2$ independently represent an alkyl group having 1 to 10 carbon atoms, and $R_3$, $R_4$, $R_5$, and $R_6$ independently represent hydrogen or an alkyl group having 1 to 5 carbon atoms.

12. The method of claim 8, wherein each said at least one aliphatic polyamine has the general formula:

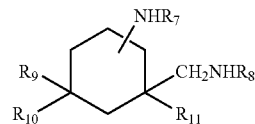

wherein $R_7$ and $R_8$ independently represent an alkyl group having from 1 to 10 carbon atoms, or a cyanoalkyl group having from 1 to 10 carbon atoms, and wherein $R_9$, $R_{10}$, and $R_{11}$ are independently hydrogen or an alkyl group having from 1 to 5 carbon atoms.

13. The method of claim 8, wherein the at least one aliphatic polyisocyanate comprises a trimer of 1,6-hexanediisocyanate.

14. A composite article comprising a coating disposed on a substrate, wherein the
coating is prepared from components comprising:
  a) at least one aliphatic polyisocyanate;
  b) at least one aliphatic polyamine; and
  c) from 8 to 17 percent by weight of at least one liquid compound, based on the total weight of components a), b) and c) combined, wherein each compound of said at least one liquid compound is independently represented by the formula:

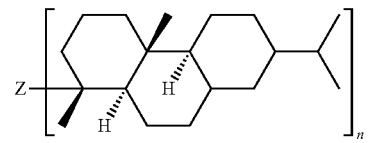

wherein Z represents an n-valent organic group, and
n represents an integer $\geq 1$.

15. The composite article of claim 14, wherein Z represents —CH$_2$OH or —C(=O)OCH$_2$CH$_2$OCH$_2$CH$_2$OCH$_2$CH$_2$OC(=O)—.

16. The composite article of claim 14, wherein said at least one aliphatic polyamine comprises an aspartic ester.

17. The composite article of claim 14, wherein said at least one aliphatic polyamine includes an aliphatic polyamine represented by the general formula

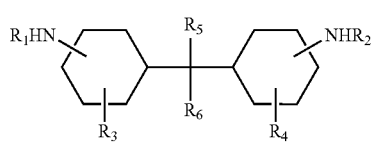

wherein $R_1$ and $R_2$ independently represent an alkyl group having 1 to 10 carbon atoms, and $R_3$, $R_4$, $R_5$, and $R_6$ independently represent hydrogen or an alkyl group having 1 to 5 carbon atoms.

18. The composite article of claim 14, wherein each said at least one aliphatic polyamine has the general formula:

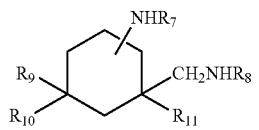

wherein $R_7$ and $R_8$ independently represent an alkyl group having from 1 to 10 carbon atoms, or a cyanoalkyl group having from 1 to 10 carbon atoms, and wherein $R_9$, $R_{10}$, and $R_{11}$ are independently hydrogen or an alkyl group having from 1 to 5 carbon atoms.

19. The composite article of claim 14, wherein the at least one aliphatic polyisocyanate comprises a trimer of 1,6-hexanediisocyanate.

* * * * *

UNITED STATES PATENT AND TRADEMARK OFFICE
CERTIFICATE OF CORRECTION

PATENT NO. : 9,587,139 B2
APPLICATION NO. : 14/399254
DATED : March 7, 2017
INVENTOR(S) : Alexander Kugel et al.

Page 1 of 1

It is certified that error appears in the above-identified patent and that said Letters Patent is hereby corrected as shown below:

In the Specification

Column 8
Line 47, delete "stoichimetric" and insert -- stoichiometric --, therefor.

Column 9
Line 15, delete "earth." and insert -- earth, --, therefor.

Column 10
Line 43 (approx.), delete "C(=O)—." and insert -- OC(=O)—. --, therefor.

Column 12
Line 2, delete "C(=O)—." and insert -- OC(=O)—. --, therefor.

Column 13
Line 27 (approx.), delete "C(=O)—." and insert -- OC(=O)—. --, therefor.

Column 14
Line 52, delete "mPa · s" and insert -- mPa·s --, therefor.

In the Claims

Column 20
Line 46, in Claim 15, delete "—C(—O)" and insert -- —C(=O) --, therefor.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*